Figure 1:
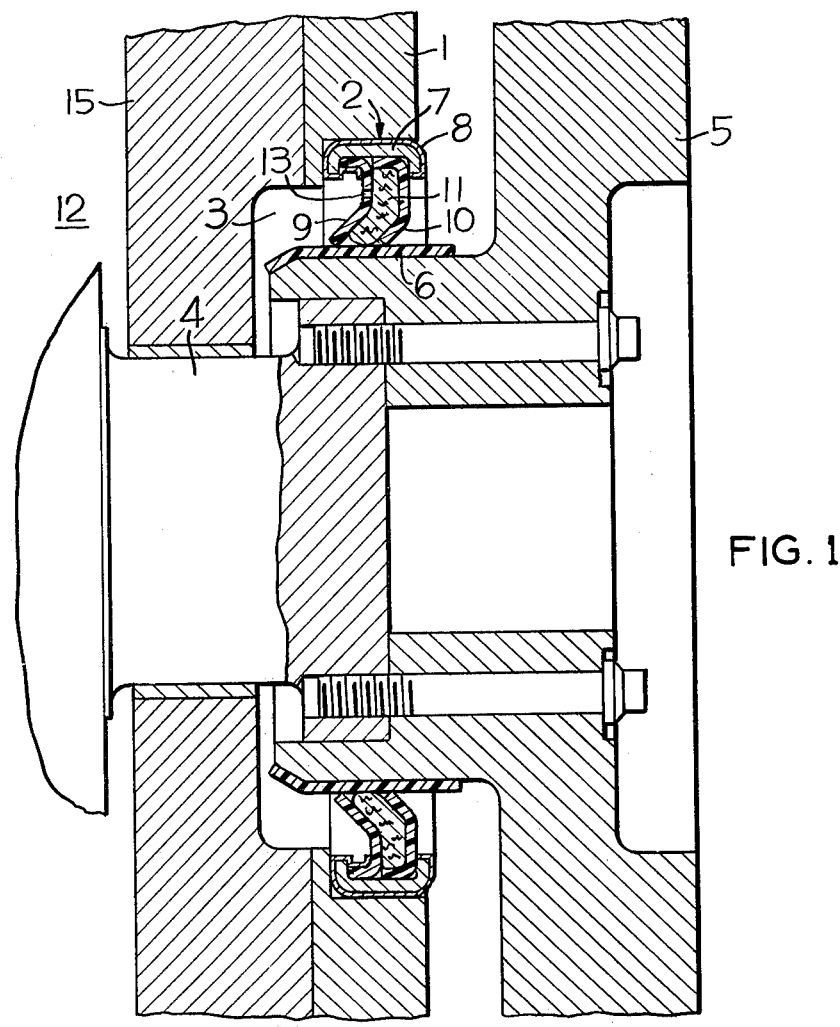

United States Patent [19]

Belsanti

[11] 4,427,201

[45] Jan. 24, 1984

[54] DOUBLE SEAL HAVING VIBRATION DAMPING AND LUBRICATING MEANS

[75] Inventor: James F. Belsanti, Blue Island, Ill.

[73] Assignee: Allis-Chalmers Corporation, Milwaukee, Wis.

[21] Appl. No.: 412,823

[22] Filed: Aug. 30, 1982

[51] Int. Cl.³ .................. F16J 15/16; F16J 15/32
[52] U.S. Cl. .................................. 277/24; 277/59; 277/70; 277/97; 277/152
[58] Field of Search ................ 277/35, 47–50, 277/59, 97, 152, 153, 70, 24

[56] References Cited

U.S. PATENT DOCUMENTS

| | | | |
|---|---|---|---|
| 2,049,366 | 7/1936 | Gardner | 277/47 |
| 2,245,475 | 6/1941 | Hately | 277/35 X |
| 3,044,786 | 7/1962 | Chillion | 277/70 |
| 3,510,177 | 5/1970 | Shimula | 277/59 X |
| 3,545,770 | 12/1970 | Wheelock | 277/152 |
| 3,934,311 | 1/1976 | Thompson | 277/59 X |
| 3,955,859 | 5/1976 | Stella et al. | 277/70 X |
| 4,277,072 | 7/1981 | Forch | 277/153 X |
| 4,278,260 | 7/1981 | Brown | 277/152 X |

FOREIGN PATENT DOCUMENTS 379967 9/1932 United Kingdom ............... 277/153

Primary Examiner—Robert S. Ward
Attorney, Agent, or Firm—Arthur L. Nelson

[57] ABSTRACT

A double seal arrangement for a rotating shaft having an intermediate oil containing damping medium to lubricate the primary and secondary sealing lips.

10 Claims, 2 Drawing Figures

DOUBLE SEAL HAVING VIBRATION DAMPING AND LUBRICATING MEANS

This invention relates to a seal for a rotating shaft and more particularly to a double seal arrangement with an intermediate oil containing damping medium providing an oil film for lubricating the primary and secondary sealing lips.

The conventional internal combustion engine employs an oil seal on the end of the crankshaft which seals oil within the engine cavity while sealing water, oil and other foreign material from entering the engine. A double seal arrangement may be used with the primary or inner seal to seal the oil while the secondary seal or external seal seals out water and so on. Normally the primary seal is lubricated from the oil internally of the engine while the secondary seal or outer seal has a tendency to run dry which may cause it to burn up. Dirt in the seal may cause abrasion due to the lack of resilience of the seal when it becomes dry and hard. Accordingly, the applicant has provided for a vent hole in the primary seal to allow oil to penetrate and be absorbed in the oil containing medium and provide lubrication for the secondary seal lip. This keeps the seal pliable and dirt and grit has a less abrasive effect to avoid burning up of the seal and premature failure.

The Sikora patent, U.S. Pat. No. 3,250,580 Seal for Grease Lubricated Antifriction Bearings, shows an antifriction bearing seal. The seal includes two metal disk seals forming a grease chamber for lubrication of the bearing. It does not provide for supplying oil from the internal cavity of the engine or an oil carrying medium to lubricate a resilient and flexible sealing lip. The applicant has provided for two sealing lips of material such as teflon for engaging a shaft to provide a seal. An intermediate oil carrying medium lubricates the sealed lips to keep the sealing lips pliable, lubricated, and in good operating condition.

It is an object of this invention to provide a double seal arrangement for a rotating shaft having an intermediate oil carrying medium for lubricating the sealing lips.

It is another object of this invention to provide a double seal arrangement for a rotating shaft having a primary and secondary seal with an intermediate oil permeated damping pad for lubrication of the seals.

It is a further object of this invention to provide a double seal arrangement for a rotating shaft having a primary oil lip and secondary dirt sealing lip with an intermediate oil permeated damping pad for lubricating the sealing lips and providing internal and external sealing.

The objects of this invention are accomplished by providing a metal seal supporting case carrying primary and secondary sealing lips with an oil permeated intermediate medium to damp vibrations of the sealing lips. The permeated medium provides a lubrication of the secondary seal lip. The metal case may be coated with a sealant on the external surface on the outer periphery of the seal mounting. The primary seal is an internal oil seal to provide sealing from the internal engine cavity. The secondary seal is an external dirt seal to seal water and any foreign material entering from externally of the engine.

Figure 2:
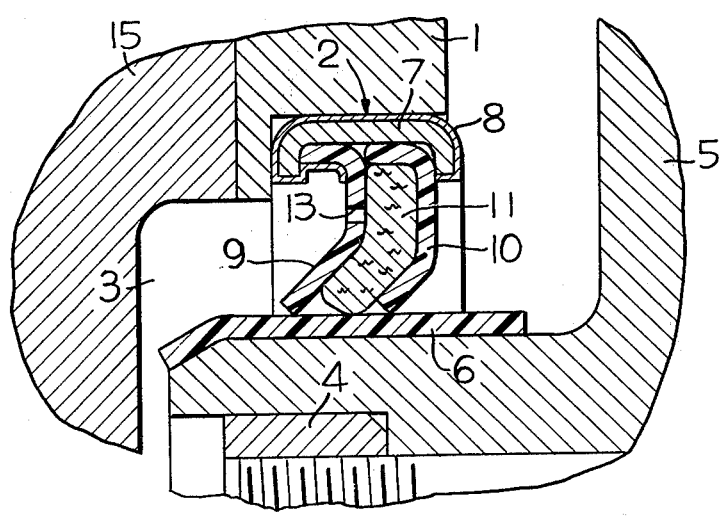

Referring to the drawings:

FIG. 1 illustrates the seal mounted in the engine housing and sealing a crankshaft of the engine; and FIG. 2 is an enlarged cross section view of the seal.

Referring to the drawings the preferred embodiment of this invention is illustrated. The engine housing 1 provides a support for the seal assembly 2 to seal the opening 3 between the housing and the crankshaft 4 rotatably mounted within the engine which carries the flywheel 5. A wear sleeve 6 is mounted on the flywheel 5 and engages the seal assembly 2. The seal assembly 2 consists of a metal case 7 coated externally with a sealant 8 to form a positive seal around the periphery of the seal within the housing 1. The metal case 7 supports the primary sealing lip 9 and the secondary lip 10. Intermediate the lips 9 and 10 is an oil permeated medium 11 which supports the primary and secondary lips 9 and 10 and operates as a damping medium as well as a lubricating medium for the secondary lip 10. The internal cavity 12 of the engine contains some lubricating oil and vapors of the lubricating oil. Accordingly, the primary seal lip 9 is basically an oil seal. The secondary seal lip 10 is an external seal and seals foreign material from entering the engine cavity 12.

The primary seal is preferably constructed of a material such as Teflon while the secondary seal may also be constructed of teflon or plastic or other desirable flexible material.

The primary seal 9 is constructed with perforations 13 which extend through the seal to the oil permeated medium 11 allowing oil to permeate the medium for lubricating of the secondary seal 10. The oil permeated medium 11 may be of a felt, sponge or other porous material which will absorb oil to provide a damping medium for the primary and secondary seals as well as operates a lubricating medium for the secondary seal 10.

The seal operates in the following manner: the seal 2 is mounted in the housing 1 with the seal lips engaging the wear sleeve 6 mounted on the flywheel 5 which, in turn, is connected to the crankshaft 4. The internal cavity 12 of the engine 15 normally contains fumes of oil and oil which may be churned around in the crankcase. The primary seal lip 9, bears against the wear sleeve 6 and prevents oil from leaking from the engine. Any foreign material is prevented from coming through the opening 3 by means of a secondary seal 10 which also bears against the wear sleeve 6. The oil permeated medium 11 lubricates the secondary seal 10 to keep it pliable and in good operating condition to prevent abrasion from wearing the seal. The oil permeated medium 11 also is a vibration damping material which prevents the primary and secondary seals from vibrating. Oil from the cavity 12 is allowed to pass through the perforations 13 supplying oil to the permeated medium 11 which supplies the lubrication for producing an oil film on the wear sleeve which in turn lubricates the secondary seal 10.

The embodiments of the invention in which an exclusive property or privilege is claimed are defined as follows:

1. A combination seal assembly comprising, a stationary means, a rotating member rotating within said stationary means, a combination seal mounted on said stationary means and engaging said rotating member including, a seal support for supporting said seal on said stationary means, a primary seal lip providing an internal oil seal, a secondary seal lip providing an external seal, an intermediate oil permeated medium forming an interface with said primary seal lip and said secondary seal lip and lubricating said secondary seal lip, means defining perforations in said primary seal lip to allow oil to permeate said medium, said seal combination thereby providing a primary internal oil seal and a secondary external dust seal on said rotating member.

2. A combination seal assembly as set forth in claim 1 including a sealant forming a cover externally on said seal casing.

3. A combination seal assembly as set forth in claim 1 wherein said oil permeated medium includes felt.

4. A combination seal assembly as set forth in claim 1 wherein said primary seal lip includes Teflon.

5. A combination seal assembly as set forth in claim 1 wherein said rotating member includes an engine crankshaft rotating mounted relative to said stationary means, a flywheel connected to said crankshaft, a wear sleeve mounted to said flywheel for engaging said combination seal assembly.

6. A combination seal assembly as set forth in claim 1 wherein said oil permeated medium defines a vibration damping means.

7. A combination seal assembly as set forth in claim 1 wherein said oil permeated medium defines a porous pad bonded to said primary and secondary seal lips.

8. A combination seal assembly as set forth in claim 1 wherein said oil permeated medium defines a bonded interface with said primary and said secondary seal lips.

9. A combination seal assembly as set forth in claim 1 wherein said seal support defines a seal casing.

10. A combination seal assembly as set forth in claim 1 wherein said stationary means defines a housing of an engine, said rotating member includes a crankshaft rotatably mounted relative to said stationary means, said combination seal assembly seals between said housing and said crankshaft to seal a crankcase cavity internally of said engine.

* * * * *